(12) United States Patent  
Vanhoecke

(10) Patent No.: US 9,129,419 B2  
(45) Date of Patent: Sep. 8, 2015

(54) METHOD AND SYSTEM FOR MONITORING THE EVOLUTION OF A PHYSICAL QUANTITY

(71) Applicant: SIEMENS AKTIENGESELLSCHAFT, Munich (DE)

(72) Inventor: Stephane Vanhoecke, Toulouse (FR)

(73) Assignee: Siemens Aktiengesellschaft, Munich (DE)

( * ) Notice: Subject to any disclaimer, the term of this patent is extended or adjusted under 35 U.S.C. 154(b) by 135 days.

(21) Appl. No.: 13/772,578

(22) Filed: Feb. 21, 2013

(65) Prior Publication Data

US 2013/0215119 A1 Aug. 22, 2013

(30) Foreign Application Priority Data

Feb. 21, 2012 (EP) ...................................... 12290061

(51) Int. Cl.
*G06T 11/00* (2006.01)
*G06T 11/20* (2006.01)

(52) U.S. Cl.
CPC ................ *G06T 11/00* (2013.01); *G06T 11/206* (2013.01)

(58) Field of Classification Search
None
See application file for complete search history.

(56) References Cited

U.S. PATENT DOCUMENTS

| 2007/0176933 | A1* | 8/2007 | Culpi et al. ................. 345/440.2 |
| 2008/0135309 | A1 | 6/2008 | Yuyama et al. |
| 2012/0262472 | A1* | 10/2012 | Garr et al. ..................... 345/589 |

\* cited by examiner

*Primary Examiner* — David Zarka  
*Assistant Examiner* — Diana Hickey  
(74) *Attorney, Agent, or Firm* — Laurence A. Greenberg; Werner H. Stemer; Ralph E. Locher

(57) ABSTRACT

A method monitors an evolution of a physical quantity. The method includes measuring the evolution of the value of the physical quantity, and displaying in a first graphical zone a bar graph representing the evolution of the value received from the sensor until this value reaches a first threshold, the graphical zone has a first displaying scale. When the monitored value reaches the first threshold, the bar graph is displayed and represents the evolution of the value received from the sensor in a second graphical zone. The second graphical zone is a zoom of a part of the first graphical zone and has at least a second displaying scale. At least one magnified portion of the second graphical zone is further displayed, the magnified portion having at least a third displaying scale.

13 Claims, 4 Drawing Sheets

Blue zone

Yellow zone

Green zone

Red zone

METHOD AND SYSTEM FOR MONITORING THE EVOLUTION OF A PHYSICAL QUANTITY

CROSS-REFERENCE TO RELATED APPLICATION

This application claims the priority, under 35 U.S.C. §119(e), of European patent application No. EP 12 290 061.6 filed Feb. 21, 2012; the prior application is herewith incorporated by reference in its entirety.

BACKGROUND OF THE INVENTION

Field of the Invention

The invention relates to a method and a system for monitoring the evolution of a physical quantity. In particular, the invention concerns a method and a system for monitoring such a physical quantity relating to a material composing a pharmaceutical product.

In pharmaceutical production environment, the raw materials used to manufacture a product are quantified in a recipe. On numerous occasions an operator has to introduce manually each component of the pharmaceutical product in the recipe. For evident public health reasons, it is very important that the operator introduces each ingredient in the required quantity and with limited compulsory predefined minimal and maximal tolerances. As already mentioned, this process is done manually and should be done as quickly as possible and also independently from the environment in which the operator works.

For example, in a particular recipe, an operator may have to weigh 100 g plus or minus 0.0001 g, the tolerance window the operator has to enter is therefore really restricted in comparison with the total quantity of raw material. Furthermore, an error made by the operator in the above mentioned tolerance means that the whole pharmaceutical product has to be thrown away because it cannot be used at all and of course cannot be sold.

In this regard, the concrete example of preparation of a liquid composition used in dialysis treatment can be cited. In this pharmaceutical product, water is mixed with a small quantity of active ingredient. This process is very simple and the key point is the active ingredient quantity added to the water. If, from the beginning the dosage is wrong, the whole mixture cannot be used and this is a time and money loss.

Therefore, there is a clear need in pharmaceutical production processes, wherein very small tolerances are allowed in comparison with the whole quantity of raw material and wherein human being operators are involved, to monitor accurately the quantity of product introduced in the recipe.

SUMMARY OF THE INVENTION

It is accordingly an object of the invention to provide a method and a system for monitoring the evolution of a physical quantity, which overcome the above-mentioned disadvantages of the prior art methods and devices of this general type. An important objective of the present invention is to allow the operator to perform the dosage operation right the first time and avoid the product being non-usable and therefore to increase the production rate by saving time and money.

Given the above mentioned objectives, the invention proposes according to a first aspect a method for monitoring the evolution of a physical quantity, such a physical quantity being a component of a pharmaceutical product. The method includes measuring the evolution of the value of the physical quantity, and displaying in a first graphical zone a bar graph representing the evolution of the value received from the sensor until this value reaches a first threshold, the graphical zone having a first displaying scale. When the monitored value reaches the first threshold, the bar graph representing the evolution of the value received from the sensor is displayed in a second graphical zone. The second graphical zone being a zoom of a part of the first graphical zone and has at least a second displaying scale. At least one magnified portion of the second graphical zone is further displayed, the magnified portion having at least a third displaying scale.

The method according to the invention can also contain several other features, taken alone or in combination.

The second graphical zone can replace the first graphical zone when the second graphical zone is displayed. The magnified portion can be displayed within the second graphical zone.

A target value indicator can be displayed within the magnified portion.

A minimum tolerance value indicator and a maximum tolerance value indicator delimiting the magnified portion are displayed within the second graphical zone.

The second graphical zone contains at least four different displaying areas or portions consecutively extending along the second graphical zone length, each displaying area having a displaying scale different from the others.

A first zoom area can extend from a first threshold indicator to the minimum tolerance values indicator and has a first scale.

A first magnification area can extend from the minimum tolerance value indicator to the target value indicator and has a second scale.

A second magnification area can extend from the target value indicator to the maximum tolerance values indicators and has a third scale.

A second zoom area extends from and beyond the maximum tolerance values indicators and has a fourth scale.

A graphical status indicator is further displayed within each graphical zone, the graphical status indicator contains at least two horizontal bars appearing at different locations of the bar graph zones depending on the current value of the monitored value.

When the monitored value is under a second predefined threshold, each horizontal bar extends from the left hand side starting point of the first or second bar graph zone to a second threshold indicator.

When the monitored value is between a second predefined threshold and the minimum tolerance value, each horizontal bar extends between the graphical indicators of those two values.

When the monitored value is between a predefined minimum tolerance value and a predefined maximum tolerance value, each horizontal bar extends between the minimum and maximum tolerance value indicators and is centered relative to the set point indicator.

When the monitored value is greater than a maximum tolerance value, each horizontal bar extends from and beyond the graphical maximum tolerance values indicator.

A completion indicator is further dynamically displayed and indicates the percentage of the set point value already reached since the beginning of the monitoring process.

The completion indicator is displayed in a graphical form and in a numerical form, the graphical form contains a ring which is angularly filled depending on the percentage of completion of the monitoring process and within this ring, a numerical value representing the same percentage is also displayed and regularly updated in real time.

A second aspect of the invention is a system for monitoring the evolution of a physical quantity, such as a physical quantity of a component of a pharmaceutical product, for carrying out the method according as above defined. The system includes a sensor for measuring the evolution of the value of the physical quantity, the sensor being communicatively connected with a computer provided with a processor. Means are provided for displaying the evolution of the value, the means is communicatively connected with the computer and receives displaying instructions from the processor. A memory has instructions for displaying in a first graphical zone a bar graph representing the evolution of the value received from the sensor until this value reaches a first threshold, the bar graph zone having a first displaying scale. When the monitored value reaches the first threshold, the bar graph representing the evolution of the value received from the sensor is displayed in a second graphical zone. The second graphical zone is a zoom of a part of the first graphical zone and has at least a second displaying scale. At least one magnified portion of the second graphical zone is further displayed, the magnified portion has at least one third displaying scale.

A third aspect of the invention is a non-transitory computer readable media having program instructions which when executed by a processor cause the processor to perform the above described method.

Thanks to the invention no more weighing errors occur. The invention allows an accurate dosage from the beginning and thus avoids loosing time and money during the production process.

Other features which are considered as characteristic for the invention are set forth in the appended claims.

Although the invention is illustrated and described herein as embodied in a method and a system for monitoring the evolution of a physical quantity, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
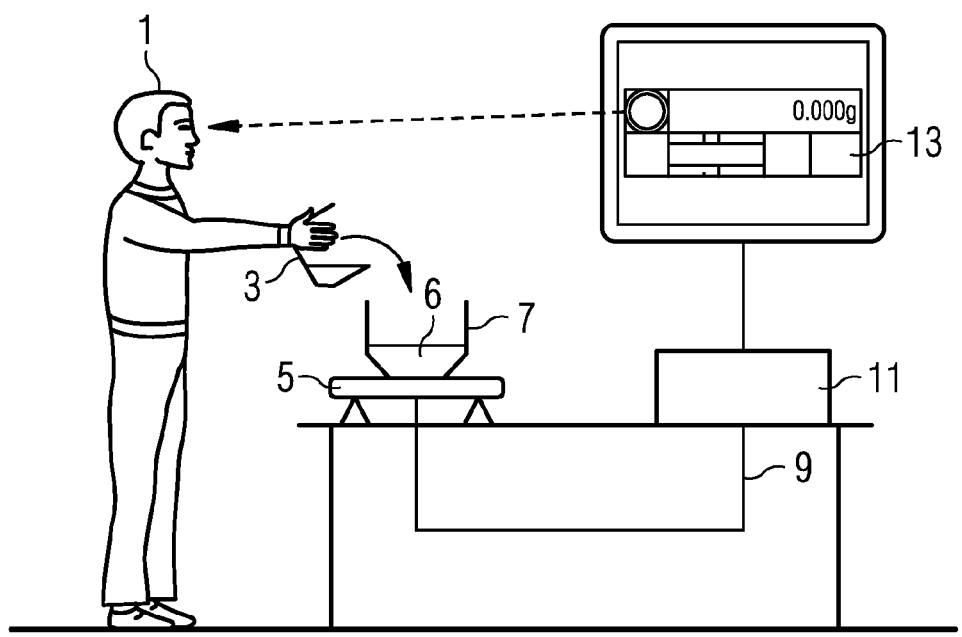
FIG. 1 is an illustration of a system according to the invention.

Referring now to the figures of the drawing in detail and first, particularly, to FIG. 1 thereof, there is shown a schematic view of a system according to the invention. The system contains a sensor 5 which outputs a value depending on the quantity of raw material 6 introduced by an operator 1 from a first container 3 into a second container 7. The sensor 5 is communicatively connected to a computer in turn connected to a display 13.

In the embodiment of FIG. 1, the sensor 5 is a digital balance measuring the mass of the raw material 6 introduced in the second container 7. The information is transmitted via a communication line 9 to a computer 11. The computer 11 includes a non-illustrated memory containing instructions for displaying the raw material mass evolution on a screen 13. For this purpose, the computer 11 is connected to the display 13. The operator can follow the evolution of the product mass by consulting the screen 13 while discharging the raw material from the first to the second container.

During a weighing procedure, the sensor 5 continuously sends information to the computer 11 which in turn sends displaying instructions to the display 13.

Figure 2A:
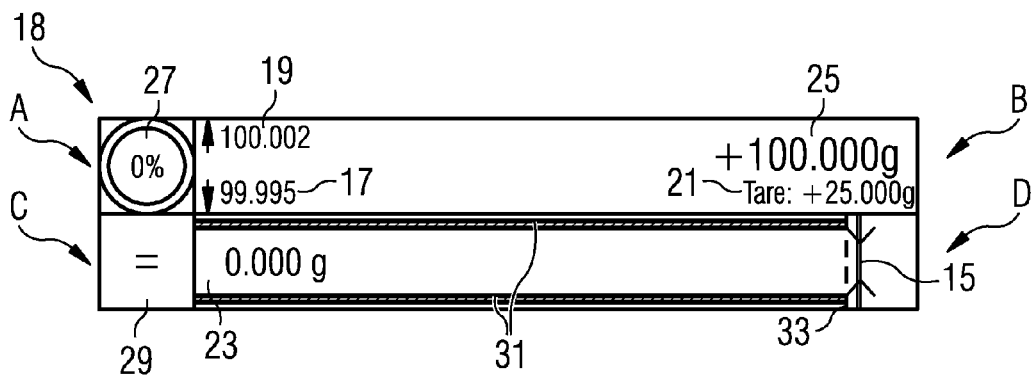
FIG. 2A is an illustration of a monitoring display according to the invention before a weighing process.
Figure 2B:
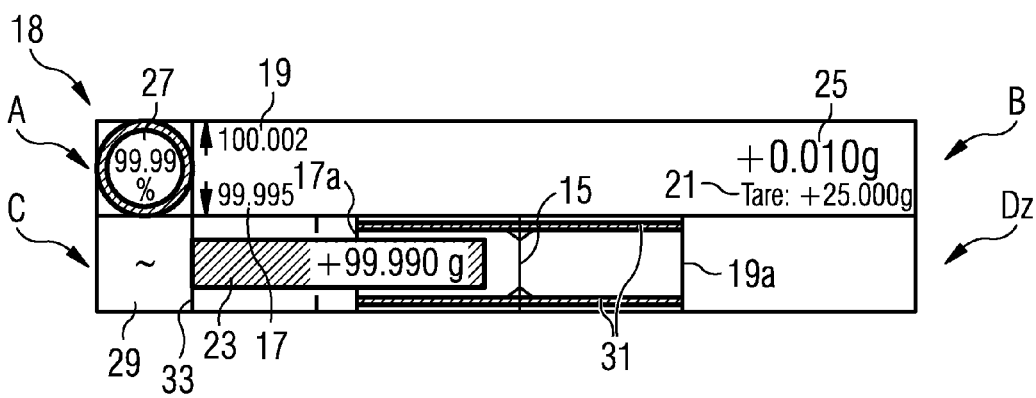
FIG. 2B is an illustration of a monitoring display according to the invention during a weighing process.
Figure 2C:
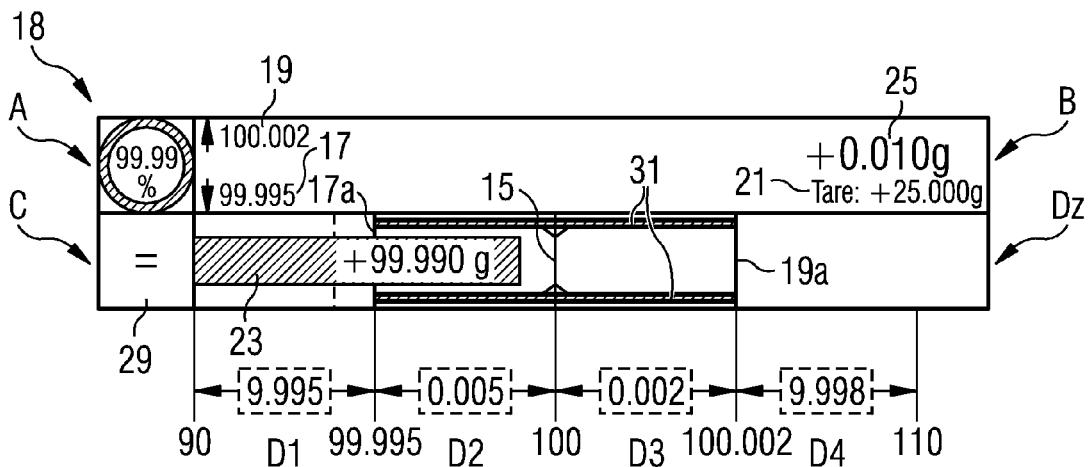
FIG. 2C is an enlarged illustration of FIG. 2B wherein further details have been added.

FIGS. 2A, 2B and 2C are detailed views of the display or screen 13 respectively before (FIG. 2A) and during (FIGS. 2B and 2C) weighing operations according to an embodiment of the present invention. A control display 18 according to the invention shows on screen 13 a plurality of information helping the operator to add precisely the requested quantity of raw material in the second container 7. The control display 18 has a general rectangular shape and is divided in four different zones A, B, C and D.

The first zone A, located on the top left of the control display 18 contains a progression or completion indicator 27. The progression or completion indicator 27 dynamically indicates the percentage of the set point value already reached since the beginning of weighing of current raw material. In the embodiment of FIGS. 2A, 2B and 2C the progression or completion degree is displayed in a graphical form and in a numerical form. The graphical form contains a ring which is angularly filled depending on the percentage of completion of the weighing process. Within this ring, a numerical value representing the same percentage is also displayed and regularly updated in real time.

The second zone B located on the top right of the control display 18 contains a plurality of numerical information.

Minimum 17 and maximum 19 tolerance values are also shown, these values are also highlighted by down and up arrows.

A tare value 21 indicates the mass of the second container 7 and of the material already present in the second container 7 before the beginning of the current raw material weighing procedure. The tare value 21 is displayed in a numerical form because this information must not be ambiguous.

A remaining quantity 25 indicates the current raw material mass missing to reach the set point; the remaining quantity 25 is displayed in a numerical form. The remaining quantity 25 shows the user what is missing to reach the set point. It's the information that drives the user to perfectly reach the set point.

The third zone C located on the bottom left of the control display 18 contains a stability indicator 29 showing if the actual weight is stable or not. Two symbols are used to display this information:

Symbol "=" means stable

Symbol "~" means not stable.

The fourth graphical zone D located at the bottom right of the control display 18 contains a bar graph 23 showing the evolution of the current mass of the added material. The bar graph is regularly updated by the computer 11 and moves forward depending on information coming from the sensor 5.

Furthermore, the current mass value of the added raw material is also displayed in a numerical form. A set point indicator 15 is drawn in the graphical zone D as a vertical line marked by arrows to represent the target to reach. The minimum and maximum tolerance value indicators 17a and 19a are also displayed with two vertical lines. At least two colored horizontal bars 31 indicate the state of the current weighing (under targeted value, near targeted values, inside tolerances values, over maximum targeted value). In the embodiment of FIGS. 2A and 2B, a first colored bar is located above the bar graph 23 and a second colored bar is located below the bar graph 23.

As mentioned above and as can be seen in FIGS. 2A, 2B and 2C all important information are displayed graphically and a numerically. This increases the legibility of the information for the operator.

The computer 11 contains a non-illustrated processor in communication with the sensor 5 and with a memory. The processor is configured to execute computer readable instructions stored in its memory or in any other computer readable media which modify the control display 18 and which allow the control display 18 to have a particular behavior depending on the information coming from the sensor 5. This particular intelligent behavior helps the operator during weighing operations. The memory also contains all different views and graphical information needed to update the control display 18 during a monitoring process.

The computer 11 via its processor continuously monitors the value coming from the sensor 5, and updates in real time the different values and graphs displayed by the screen 13 depending on the values provided by the sensor 5, i.e., and in particular in the embodiment of FIGS. 2A, 2B and 2C: a progression 27, the remaining quantity 25, the stability 29, the position of the bar graph 23 and a state 31.

According to the invention, a plurality of different graphical zones D and Dz can be displayed on the screen 13 depending on the values returned by the sensor and depending on the ratio between the current mass and the set point.

More precisely, as shown in FIG. 2A, when the current value returned by the sensor is under a first threshold graphically represented by a first threshold indicator 33, for example under 90% of the set point also call target value, the evolution of the bar graph is shown in the fourth zone D with a first linear scale going for example from 0 to 110% of the target value. In the first state (non zoomed state) of the control display 18, the graphical marks of, the set point 15, the minimal 17 and the maximal 19 tolerance values are close to each other within the graphical zone D. This enables the operator to know he can introduce a great amount of raw material at that time.

As soon as a first threshold is reached by the monitored value returned by the sensor 5 and as can be seen on FIGS. 2B and 2C, the scale is changed and a zoom is realized only on the important portion of the previous larger scale including the set point indicator 15, the minimal 17 and the maximal 19 tolerance value indicators. This is the second state of the control display 18 (the zoomed and magnified state). For the sake of clarity the zoomed graphical zone will be referenced as Dz in the rest of the patent application. For example, only the part between 90% and 110% of the previous scale is now shown on all the space previously dedicated to the graphical zone D of the screen 13, and the zoomed zone Dz replaces the previous graphical zone D. Further to the zoom, a magnification of the important part of the zoomed graphical zone Dz is also realized within the zoomed graphical zone Dz itself. The bar graph 23 is updated in real time and keeps on moving forward also in the zoomed graphical zone Dz and also in the magnified area of the zoomed graph graphical zone Dz.

FIG. 2C is a slightly enlarged view of FIG. 2B wherein details concerning the bar graph display when the first threshold is reach and the monitored value have been added for explanations purposes. Note that the added information does normally not appear when the invention is used.

As mentioned above, when the computer 11 detects that the monitored value enters 90% of the set point value, the computer 11 displays a zoom from 90% to 110% of the set point value on the screen 13 and only this portion is shown in the zoomed graphical zone Dz. In this way as soon as the operator sees this scale change he knows he needs to be more careful and precise and that he needs to introduce the raw material more slowly.

In this zoomed mode or state, to help the users to correctly reach the set point and because the tolerance is very fine, the monitored values, in the present embodiment the mass of the raw material, is not linearly displayed and, a part of the zoomed graphical zone Dz is magnified. This means that at least two different scales are used and shown in the same zoomed graphical zone Dz.

In the embodiment of FIG. 2C, the graphical zone Dz is divided in four different scale areas or portions D1 to D4. Each area D1 to D4 has a different scale but the four zones or areas D1 to D4 may have the same graphical length.

In the example of FIG. 2C, the different areas are defined as follows:

D1: a first area displaying a value from 90 to 99.995 g with a delta of 9.995 g

D2: a second area displaying values from 99.995 to 100 g with a delta of 0.005 g

D3: a third area displaying values from 100 to 100.002 g with a delta of 0.002 g

D4: a last zone displaying values from 100.002 to 110 g with a delta of 9.998 g.

As can be easily understood, areas or zones D1 and D4 are the zoomed areas and areas D2 and D3 are the magnified areas. In the example of FIG. 2C the magnified area has the same length but do not represent the same real interval of values, i.e. in the embodiment of FIG. 2C, 9.995 g for area D1, 0.005 g for area D2 0.0002 g for area D3 and 9.998 g for area D4. In other words, the entering tolerance value 17 and the exiting tolerance value 19 can be set and may not be symmetrical relative to the set point value. This may be the case depending of the raw material to introduce in the recipe. However, according to the invention the minimum tolerance value indicator 17a and the maximum tolerance value indicator 19a are shown symmetrically relative to the set point indicator 15 in the zoomed graphical zone Dz. This allows an operator to easily identify the tolerance values and also to stay between the tolerance values 17 and 19. Furthermore, the operator does not need to focus on the numerical monitored value itself but only on the visual information provided in the zoomed graphical zone Dz. The operator only needs to follow the evolution of the bar graph 23 and its position relative to the set point indicator 15 and relative to the tolerance indicators 17a and 19a. The weighing process can therefore be realized only by looking at the screen 13 and the operator does not really need to care about the real values of the physical quantity.

In the present patent application the words "magnification" or "magnified" means that a further zoom is applied within an already zoomed zone as if a magnifying glass was introduced within the already zoomed zone. This means that on the graphical zone Dz at least two different scales can be shown. In the embodiment of FIG. 2C four different scales are used, one for each area D1 to D4 as above defined. For example, the zoom of magnification areas D2 and D3 may be between 10 times and up to 2000 times greater than the zoom used in the zoomed areas D1 and D4. Of course other values may be used by the skilled man, as far as the magnification areas D2 and D3 are portions much more zoomed than the zoomed areas D1 and D4. Further, in the embodiment of FIG. 2C the set point indicator 15 is located in the middle of the zoomed graphical zone Dz.

FIGS. 3A-3E are views of one embodiment of the invention and show further details of the invention. Please note that in FIGS. 3A to 3E all reference numbers have not been added for the sake of clarity but of course these figures show a control display similar to those of FIGS. 2A-2C and the reference numbers of FIGS. 2A-2C also apply for FIGS. 3A-3E.

According to one embodiment, the two colored horizontal bars 31 are used to indicate visually the status of the raw material 6 introduced in the second container 7 relative to the set point and relative to the tolerance values 17 an 19. As can be seen on FIGS. 3A to 3E the horizontal bars 31 appear in different locations depending on the raw material measured mass. Furthermore, the color of the control display 18 also changes depending on this status.

Figure 3A:
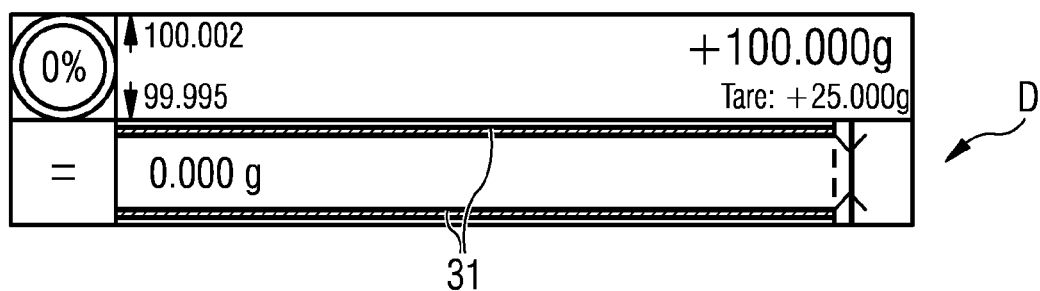
FIGS. 3A-3E are illustrations of a monitoring display according to the invention showing different statuses of the monitoring of the value of a physical quantity according to the invention.
Figure 3B:
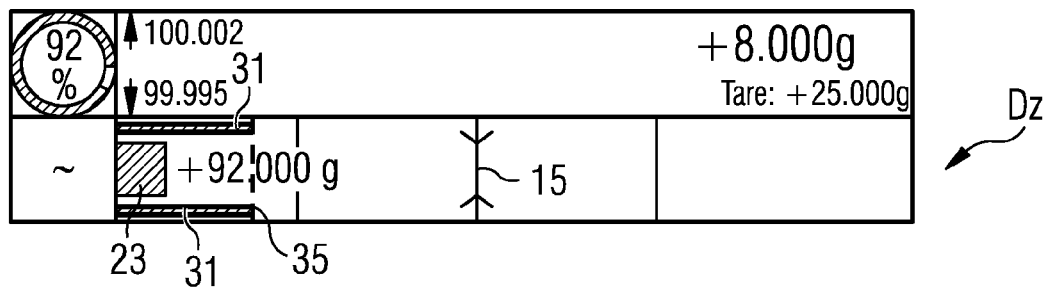
Figure 3C:
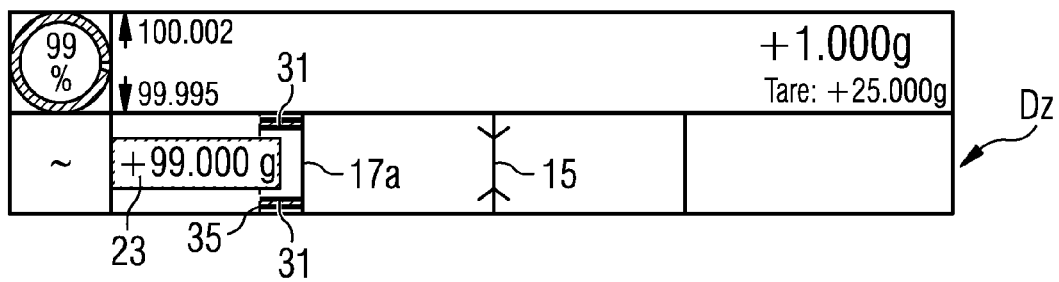
Figure 3D:
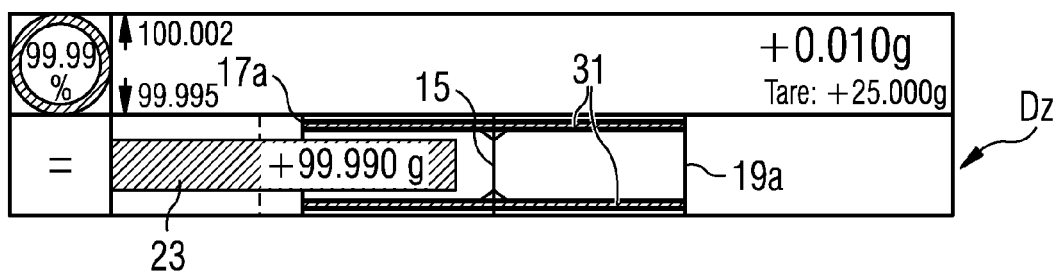

More precisely, when the monitored value is under the minimum of a second threshold represented by the second threshold indicator 35, each horizontal bar 31 extends from the left hand side starting point of the zone D or Dz to second threshold indicator 35. FIG. 3A shows the situation where the monitored value is under the first zooming threshold 33 and when no zoom has occurred. FIG. 3B shows the situation where a zoom has occurred and when the monitored value represented by the bar graph 23 is still under a second threshold represented by a second threshold indicator 35. The second threshold represented by the second threshold indicator 35 can be set for example at 98% of the value to reach represented by the graphical set point 15. In this state the control display 18 appears in blue.

When the monitored value is between the second threshold and the minimum tolerance value 17, each horizontal bar 31 extends between the second threshold indicator 35 and the minimum tolerance value indicator 17a. This can be seen in FIG. 3C. In this state the control display 18 appears in yellow.

When the monitored value is between the minimum and maximum tolerance values, each horizontal bar 31 extends between the graphical minimum and maximum tolerance values 17a and 19a and is centered relative to the graphical set point 15. In this state the control display 18 appears in green.

Figure 3E:
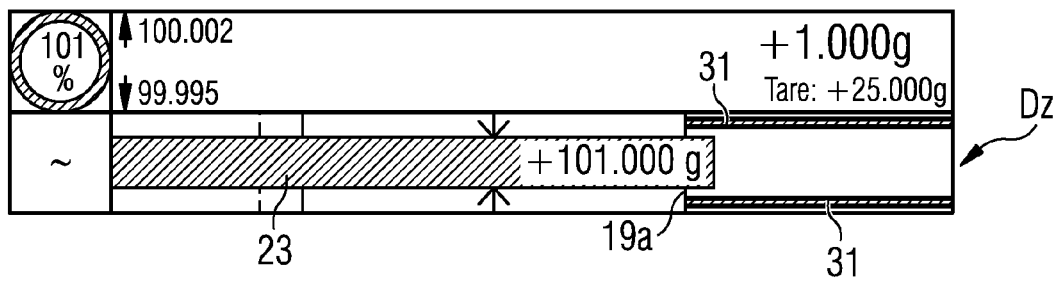

When the monitored value is greater than the maximum tolerance value 19, each horizontal bar 31 extends from and beyond the graphical maximum tolerance values 19 as can be seen in FIG. 3E. In this state the control display 18 appears in red.

Thanks to the combination of the location and form changing of the horizontals bars 31 and the colored context, depending on the monitored value, an operator can directly and at first view recognize in which status the weighing process is and can avoid any mistake. Further the location and form changing of the horizontals bars 31 alone allow blind color operators to also realize the weighing and to benefit from the advantages of the invention.

Of course, even if the present invention has been presented in relation with the production of pharmaceutical product, it can be used in all technical fields requiring accurate monitoring of a physical value, in particular in processes where human being are involved.

The following advantages are provided with the use of the invention. The operator has a better control of the process. The operator's precision is enhanced. A better efficiency is obtained due to a decrease of handling errors. The operator reaches more easily the target in one shot, the first time and in one step.

This avoids what is not appropriate in pharmaceutical production namely the fact that the operator needs to take out some material.

The invention claimed is:

1. A method for monitoring an evolution of a physical quantity, which method comprises the steps of:
measuring the evolution of a value of the physical quantity via a sensor;
displaying on a display in a first graphical zone a bar graph representing the evolution of the value received from the sensor until the value reaches a first threshold, the first graphical zone having a first displaying scale;
performing the following steps when the value reaches the first threshold:
displaying on the display the bar graph representing the evolution of the value received from the sensor in a second graphical zone, the second graphical zone being a zoom of a part of the first graphical zone, wherein the second graphical zone having at least four different displaying areas or portions consecutively extending along a second graphical zone length, each of the four different displaying areas having a displaying scale different from each other, the four different displaying areas including:
a first zoom area extending from a first threshold indicator to a minimum tolerance value indicator and having a first scale;
a first magnification area extending from the minimum tolerance value indicator to a target value indicator and having a second scale;
a second magnification area extending from the target value indicator to the maximum tolerance value indicator and having a third scale; and
a second zoom area extending from and beyond the maximum tolerance value indicator and having a fourth scale.

2. The method according to claim 1, which further comprises replacing the first graphical zone with the second graphical zone when the second graphical zone is displayed.

3. The method according to claim 1, which further comprises displaying a target value indicator within one of the first and second magnification areas.

4. The method according to claim 3, which further comprises displaying a minimum tolerance value indicator and a maximum tolerance value indicator delimiting one of the first and second magnification areas within the second graphical zone.

5. The method according to claim 4, which further comprises displaying a graphical status indicator within each of the first and second graphical zones, the graphical status indicator containing at least two horizontal bars appearing at different locations of the first and second graphical zones depending on a current value of the value monitored.

6. The method according to claim 5, wherein when the value is under a second predefined threshold, each of the horizontal bars extends from a left hand side starting point of the first or second bar graph zones to a second threshold indicator.

7. The method according to claim 5, wherein when the value is between a second predefined threshold and the minimum tolerance value, each of the horizontal bars extends between graphical indicators of the two values.

8. The method according to claim 5, wherein when the value is between a predefined minimum tolerance value and a predefined maximum tolerance value, each of the horizontal bars extends between the minimum and maximum tolerance value indicators and is centered relative to a set point indicator.

9. The method according to claim 5, wherein when the value is greater than a maximum tolerance value, each of the horizontal bars extends from and beyond the maximum tolerance values indicator.

10. The method according to claim 1, which further comprises dynamically displaying a completion indicator and the completion indicator indicates a percentage of a set point value already reached since a beginning of monitoring process.

11. The method according to claim 10, which further comprises displaying the completion indicator in a graphical form and in a numerical form, the graphical form containing a ring which is angularly filled depending on a percentage of completion of a monitoring process and within the ring, a numerical value representing a same percentage is also displayed and regularly updated in real time.

12. A system for monitoring an evolution of a physical quantity, the system comprising:
a computer having a processor;
a sensor for measuring the evolution of a value of the physical quantity, said sensor being communicatively connected with said computer;
a display for displaying the evolution of the value, said display being communicatively connected with said computer and receiving displaying instructions from said processor;
a memory having instructions for:
displaying in a first graphical zone a bar graph representing the evolution of the value received from said sensor until the value reaches a first threshold, the first graphical zone having a first displaying scale;
when the value reaches the first threshold:
displaying the bar graph representing the evolution of the value received from said sensor in a second graphical zone, the second graphical zone being a zoom of a part of the first graphical zone,
wherein the second graphical zone having at least four different displaying areas or portions consecutively extending along a second graphical zone length, each of the four different displaying areas having a displaying scale different from each other, the four different displaying areas including:
a first zoom area extending from a first threshold indicator to a minimum tolerance value indicator and having a first scale;
a first magnification area extending from the minimum tolerance value indicator to a target value indicator and having a second scale;
a second magnification area extending from the target value indicator to the maximum tolerance value indicator and having a third scale; and
a second zoom area extending from and beyond the maximum tolerance value indicator and having a fourth scale.

13. A non-transitory computer readable media having program instructions which when executed by a processor cause the processor to perform a method for monitoring an evolution of a physical quantity, which method comprises the steps of:
measuring the evolution of a value of the physical quantity;
displaying in a first graphical zone a bar graph representing the evolution of the value received from a sensor until the value reaches a first threshold, the first graphical zone having a first displaying scale;
performing the following steps when the value reaches the first threshold:
displaying the bar graph representing the evolution of the value received from the sensor in a second graphical zone, the second graphical zone being a zoom of a part of the first graphical zone.
wherein the second graphical zone having at least four different displaying areas or portions consecutively extending along a second graphical zone length, each of the four different displaying areas having a displaying scale different from each other, the four different displaying areas including:
a first zoom area extending from a first threshold indicator to a minimum tolerance value indicator and having a first scale;
a first magnification area extending from the minimum tolerance value indicator to a target value indicator and having a second scale;
a second magnification area extending from the target value indicator to the maximum tolerance value indicator and having a third scale; and
a second zoom area extending from and beyond the maximum tolerance value indicator and having a fourth scale.

* * * * *